(12) United States Patent
Syvanne

(10) Patent No.: US 7,146,421 B2
(45) Date of Patent: Dec. 5, 2006

(54) HANDLING STATE INFORMATION IN A NETWORK ELEMENT CLUSTER

(75) Inventor: Tuomo Syvanne, Vantaa (FI)

(73) Assignee: Stonesoft Oy, Helsinki (FI)

( * ) Notice: Subject to any disclaimer, the term of this patent is extended or adjusted under 35 U.S.C. 154(b) by 773 days.

(21) Appl. No.: 10/032,881

(22) Filed: Oct. 19, 2001

(65) Prior Publication Data

US 2002/0133594 A1 Sep. 19, 2002

(30) Foreign Application Priority Data

Mar. 19, 2001 (FI) .................................. 20010552

(51) Int. Cl.
*G06F 15/173* (2006.01)
(52) U.S. Cl. ...................... 709/226; 709/223; 709/224; 709/225; 709/238; 709/248; 370/395.32; 370/401
(58) Field of Classification Search ........ 709/223–226, 709/238–239, 248–249; 370/395.32, 401
See application file for complete search history.

(56) References Cited

U.S. PATENT DOCUMENTS

| | | | | |
|---|---|---|---|---|
| 5,548,724 | A * | 8/1996 | Akizawa et al. ............ | 709/203 |
| 5,603,029 | A * | 2/1997 | Aman et al. ................ | 718/105 |
| 6,078,957 | A * | 6/2000 | Adelman et al. ........... | 709/224 |
| 6,092,213 | A * | 7/2000 | Lennie et al. ................... | 714/3 |
| 6,667,980 | B1 * | 12/2003 | Modi et al. ............ | 370/395.32 |
| 6,691,165 | B1 * | 2/2004 | Bruck et al. ................ | 709/227 |
| 6,725,274 | B1 * | 4/2004 | Slik ........................... | 709/231 |
| 6,735,206 | B1 * | 5/2004 | Oki et al. ............. | 370/395.32 |
| 6,748,437 | B1 * | 6/2004 | Mankude et al. ........... | 709/227 |
| 6,760,765 | B1 * | 7/2004 | Asai et al. .................. | 709/226 |
| 6,772,226 | B1 * | 8/2004 | Bommareddy et al. ..... | 709/245 |
| 6,779,039 | B1 * | 8/2004 | Bommareddy et al. ..... | 709/238 |
| 6,801,949 | B1 * | 10/2004 | Bruck et al. ................ | 709/232 |
| 7,024,483 | B1 * | 4/2006 | Dinker et al. ............... | 709/227 |
| 7,035,858 | B1 * | 4/2006 | Dinker et al. .................. | 707/10 |
| 2002/0097724 | A1 * | 7/2002 | Halme et al. ............... | 370/392 |
| 2002/0112189 | A1 * | 8/2002 | Syvanne et al. ............ | 713/201 |
| 2002/0131364 | A1 * | 9/2002 | Virtanen et al. ............ | 370/230 |

FOREIGN PATENT DOCUMENTS

WO WO/00/62502 A3 4/2000
WO WO/01/19019 A1 3/2001

* cited by examiner

Primary Examiner—Saleh Najjar
Assistant Examiner—Shawki Ismail
(74) Attorney, Agent, or Firm—Ronald Craig Fish, A Law Corp

(57) ABSTRACT

A method for handling dynamic state information used for handling data packets, which arrive at a network element node of a network element cluster, said network element cluster having at least two nodes and each node handling separate sets of data packets. In a node there is maintained 206 a first, node-specific data structure comprising entries representing state information needed for handling sets of data packets handled in said node. In said node there is also maintained 208 a second, common data structure comprising at least entries representing state information needed for handling sets of data packets handled in one other node of said network element cluster. The contents of said common data structure effectively differs from the contents of said node-specific data structure. Data packets are distributed 202, 204 to nodes of the cluster by means of distribution identifiers allocated 200 to nodes. Advantageously, information related to the distribution identifiers is included 212 in the entries of the data structures in order to identify to which node a set of data packets represented by a given entry belongs to at a given moment.

23 Claims, 8 Drawing Sheets

HANDLING STATE INFORMATION IN A NETWORK ELEMENT CLUSTER

BACKGROUND OF THE INVENTION

1. Field of the Invention

The invention relates in general to handling, in nodes of a network element cluster, dynamic state information used for handling data packets, which arrive at the network element cluster. In particular the invention relates to such a method as specified in the preamble of the independent method claim.

2. Description of Related Art

Public networks are presently being used more and more for sensitive and mission critical communications and the internal networks of various organisations and enterprises are nowadays connected to the public networks, Internet being one of them. Since the basic mechanisms of the public networks were originally not designed with secrecy and confidentiality in mind, public networks are untrusted networks. To protect an internal network, a special network element is usually used to connect the internal network to a public network. This special gateway is often called a security gateway or a firewall, and the purpose of a security gateway is to prevent authorized access to the internal network. Typically there is need to restrict access to an internal network from a public network and/or to restrict access from the internal network to the public network or further networks connected to the public network. On data packet level this means that data packets, which are entering and/or exiting the internal network, are screened or filtered in a security gateway. In addition to filtering data packets a security gateway may secure data packets transmitted between, for example, some communication entities. In this case the security gateway is both a firewall and a VPN (Virtual Private Network) gateway.

The above described security gateway may consist of several similar security gateways (=nodes), i.e. it may be a security gateway cluster. The nodes of a cluster serve as backup nodes to each other and the load handled by the cluster may be balanced between the nodes. The clustered structure increases availability and distributes the load, therefore reducing the probability of a downtime to nearly zero and increasing the throughput of the security gateway. FIG. 1A illustrates a configuration where there are 3 nodes A1, A2, and A3 in security gateway cluster CA and 5 nodes B1, B2, B3, B4, and B5 in security gateway cluster CB. Nodes A1, A2, and A3 connect the internal network A to the public network 10, and nodes B1, B2, B3, B4, and B5 connect the internal network B to the public network 10.

The term network element cluster is used in this description to refer to a cluster of nodes, where state information (see below) is used for handling sets of data packets. The network element cluster may be, for example, a cluster of plain firewall nodes screening data packets, a cluster of firewall nodes provided with VPN functionality, a cluster of plain VPN devices, a cluster of IDS (Intrusion Detection System) devices, a cluster of servers or a cluster of some other suitable network elements.

Within a cluster all nodes may have individual IP addresses or they may have a common IP address. Alternatively, nodes may have both a common IP address and an individual IP address. Typically nodes share a common IP address using which the cluster is addressed. In that case all nodes see all data packets arriving at the cluster and there has to be an arrangement for distinguishing which data packets belong to which node. That is, each node should process only those packets that are assigned to it and ignore other data packets. Therefore the data packets arriving at the cluster need to be distributed to different nodes of the cluster. Typically the nodes filter all arriving data packets and decide for example on the basis of the plaintext header field(s) of the packet whether that particular node needs to process that particular packet. Alternatively, selection of a node to process a particular data packet may be done outside the nodes, e.g. in a separate network switch, and individual IP addresses of nodes used for forwarding the data packet to the selected node. Also in this case the cluster is addressed using the common IP address.

It is advantageous that the same node that processes outbound data packets of a data packet connection (i.e. packets received from the internal network) processes also the inbound data packets (i.e. packets received from the public network) related to the same connection. In other words, it is advantageous that one node processes all data packets of one set of data packets. A set of data packets may refer e.g. to the data packets of one connection or to the data packets of a communication session comprising a plurality of connections, to the data packets of a secure tunnel, or to the data packets of some other set of data packets. In fact, if all packets of a connection are not handled by the same node, the connection typically fails, unless processing of the connection is properly transferred from one node to another. A simple way to distribute data packets to nodes is to use information found in the plaintext header fields of the data packets for this purpose. It is common to use source and destination addresses and ports of data packets. Also several other fields may be used for this purpose, and for example a hash function with some information of a data packet as an input may be used for finding the node that should process a particular data packet.

Handling of data packets in a network element may be stateless or stateful. Stateless handling refers to packet filtering, where each packet is handled without any information about history of data packets belonging to the same set of data packets. Data packets are for example compared against a set of rules in which information for identifying a data packet and corresponding instructions for handling the data packet are found. Stateless handling is typically used, for example, in routers.

Stateful handling of data packets refers to a situation, where a first data packet of a set of data packets is handled without any information about history of data packets as in stateless handling, and consequently information about the respective set of data packets is stored in the network element for handling the rest of the data packets belonging to the same set of data packets. This information represents the state of the set of data packets and is referred to as state information and is stored in a data structure herein referred to as a state data structure. For example a data packet initiating a packet data connection may be handled using a set of rules, and consequently information about said packet data connection is stored in the network element for handling the rest of the data packets belonging to the same packet data connection. Security gateways typically perform stateful handling of data packets. The method is not however restricted to security gateways, but also other network elements may employ stateful handling of data packets.

The handling of first data packets in stateful handling is usually done using information specifying at least parts of data packet fields and corresponding instructions for processing a data packet. The information is usually an ordered set of rules. The order of the rules in the rule set typically defines the order in which fields of a data packet are compared to the rules. The instructions specified in the first rule, to which the header of a data packet matches, states the action to be carried out for said data packet. The rules are typically listed in a rule file in the order in which they are processed: a rule file thus typically comprises a sequence of rules Rule1, Rule2, . . . , RuleN. The rule file is typically stored in a network element using the rules, for example in nodes network element clusters CA and CB.

Typically, a state data structure entry comprises information of some fields of the corresponding data packet and possibly further additional information and possibly an action. The information included typically remains constant in all data packets of the set of data packets. Data packets having a corresponding entry in the state data structure are then handled according to that entry. A corresponding entry in a state data structure may indicate for example that the data packet is allowed to traverse a security gateway.

The part of the state data structure that is related to one set of data packets is called an entry. When a set of data packets has been handled, e.g. packet data connection has been closed, the corresponding entry is cleared in the state data structure.

An entry relating to a set of data packets may be made to a state data structure also on the basis of some other set of data packets. Consider, for example, FTP (File Transfer Protocol), which has a control connection and the files are transferred using a separate data connection. An entry relating to an FTP data connection may be added to a state data structure on the basis of a PORT command detected in the relating FTP control connection. Thus all data packets of the FTP data connection are handled using the state data structure.

One implementation for handling the state information within a network element cluster is that each node maintains its own state data structure containing state information used for handling data packets handled by said node. This is suitable and efficient in network elements operating as single nodes, but in clusters of network elements this is not very flexible, since no knowledge of the data packets handled by other nodes is maintained. Only the entries that are needed in a node are maintained in a particular node. Since the state information is required for handling data packets, transferring a connection from one node to another node would mean transferring also the state information. But this may not be always possible. For example, if a node crashes, the state information required for continuing to handle the connections is lost. Thus this solution is not viable in practice if it is required to be able to flexibly transfer connections from one node to another in a cluster.

An implementation better suitable for handling the state information within a network element cluster is that each node maintains a state data structure containing state information used for handling data packets handled by any node of said cluster, i.e. state information relating to all sets of data pockets or connections handled in said cluster. Each node adds new entries/clears old entries in its own state data structure as it handles data packets and communicates information about said new and old entries to other nodes of the cluster corresponding entries to be added/clear in their state data structure. This communicating information may be done e.g. on timely basis.

Typically there are maintained two identical state data structures in nodes described above. One is typically maintained in kernel space. This may be called an active state data structure, since data packets are handled using this state data structure and new entries are added/old entries cleared in that state data structure. The other one is in practice a duplicate of the state data structure in kernel space and is maintained in user space. The entries added/cleared in the kernel space data structure are updated to the user space data structure. The user space state data structures are typically maintained for synchronising purposes. That is, entries of the user space state data structures are communicated between nodes of the cluster. Typically information about added/cleared entries are communicated and user space state data structures of other nodes are updated accordingly. The changes in the user space state data structures are then pushed to the kernel space state data structures of respective nodes. This way both user space and kernel space state data structures contain information about all sets of data packets handled in the cluster and transferring connections between nodes is reliable, since information about the sets of data packets is readily maintained in kernel space in all nodes.

An example of a network element cluster CA in accordance with the discussion above is illustrated in FIG. 1B. Three nodes Node1, Node2 and Node3 or respectively A1, A2 and A3 of the network element cluster CA and the state data structures in the nodes are illustrated. The network element cluster CA may be for example the network element cluster CA of FIG. 1. In each node Node1, Node2 and Node3 there are maintained respectively active data structures 11$b$, 12$b$ and 13$b$, which are used for handling data packets, and additional state data structures 11$a$, 12$a$ and 13$a$ for synchronizing the state data structures of the nodes with each other. The nodes Node1, Node2 and Node3 are provided with the ability to communicate information between the state data structures of other nodes and between their own state data structures. All state data structures change dynamically in time responsive to adding new entries or clearing old entries in the state data structure of any one of the nodes. Effectively all state data structures 11–13 have identical contents including entries related to all sets of data packet handled in the cluster at a given moment of time.

The disadvantage in this solution is that, since each node needs to maintain information about all sets of data packets handled in said cluster, the size of the required state data structure may be large. This is the case especially if there are many nodes in the cluster and consequently a large number of connections handled in the cluster. The time needed for finding a match for a data packet in a state data structure clearly increases as the size of the state data structure increases, which deteriorates the performance of the nodes. At the same time, the resources for maintaining the state data structure may be limited. It may be advantageous to store the state data structure for example in a Content Addressable Memory (CAM). CAMs are memories in which data is elected based on its contents, rather than its physical location, which is usefull especially when performing a look-ups in data storage. CAMs are however typically suitable for storing only a limited number of entries in the state data structure. If the data packets handled in a network element are data packets of secure connections involving encryption/decryption in the network element, it is common to store information required for handling said data packets in a cryptographic card, which also contains only limited space for storing such information.

There is thus a problem of increasing the performance of handling data packets, when state information is used for handling sets of data packets, and maintaining the state information in nodes of a network element cluster in a way, which allows transferring connections between the nodes flexibly and reliably.

SUMMARY OF THE INVENTION

Object of the invention is to present a flexible method and arrangement for handling dynamic state information in nodes of a network element cluster. A further object is to present such a method and arrangement for handling dynamic state information which is effective and allows flexible transferring of packet data connections between nodes of a network element cluster at the same time.

The invention is characterized by that which is specified in the appended independent claims. The appended dependent claims describe some preferred embodiments of the invention. The features described in one dependent claim may be further combined with features described in another dependent claim to produce further embodiments of the invention.

Objects of the invention are achieved by maintaining in the performance-critical state data structure of a node only state information needed for handling sets of data packets handled in said node, and by maintaining in a second state data structure state information needed for handling sets of data packets handled in other nodes of said network element cluster in order to enable flexible transferring of connections between nodes. The possibility to reliably maintain these state data structures is provided especially by knowledge of how different sets of data packets are distributed within the nodes of the network element cluster.

In a node there is thus maintained two different state data structures: a first, node-specific data structure comprising entries representing state information needed for handling sets of data packets handled in said node, and in addition to said node-specific data structure a second, common data structure comprising at least entries representing state information needed for handling sets of data packets handled in one other node of said network element cluster. The contents of said common data structure effectively differs from the contents of said node-specific data structure, and the contents of the node-specific data structure is changed in the course of time to correspond to the sets of data packets handled in said node at any given moment of time.

Such an arrangement would not be possible with prior art solutions, since in this arrangement there has to be a mechanism to identify dynamically changing ownership of the sets of data packets related to the entries of the state data structures. There is typically some dynamically changing mechanism to distribute data packets, or more accurately sets of data packets, to nodes of a network element cluster. This may be done for example by means of distribution identifiers allocated to nodes. The allocation is done so that each node has a separate set of distribution identifiers allocated to it. A distribution identifier is calculated for a data packet using some fields of the data packet and the data packet is handled in the node owning the corresponding distribution identifier at the moment. Distribution identifiers are calculated so that all data packets of a set of data packets result in the same distribution identifier. Advantageously, in entries of said node-specific and common data structures is maintained distribution information relating to the corresponding distribution identifier. On the basis of this distribution information and information about the allocation of the distribution identifiers it is possible to determine to which node a set of data packets represented by an entry in a state data structure belongs.

Said distribution identifier may be for example a hash value, which is obtained by using a hash function for calculating a hash value using certain field(s) of a data packet. Said distribution information may be said distribution identifier or alternatively information needed for calculating said distribution identifier for corresponding data packet. This information may be for example the information of said certain field(s) of data packets.

Further said distribution identifiers may be reallocated to the nodes of said network element cluster. If said reallocation results in a new distribution identifier being allocated to a node, said new distribution identifier being a distribution identifier not allocated to said node at the time of the reallocation, the entries corresponding to said new distribution identifier are identified in the common data structure of said node, and said entries are added to the node-specific data structure of said node. Whereas if said reallocation results in an old distribution identifier not being allocated to a node anymore, said old distribution identifier being a distribution identifier allocated to said node at the time of the reallocation, the entries corresponding to said old distribution identifier are identified in the node-specific data structure of said node, and said entries are cleared from the node-specific data structure of said node.

When a new entry is added to said node-specific data structure in a first node, said new entry is communicated to other nodes of the network element cluster, and an entry corresponding to said new entry is added to the common data structure of the other nodes. An entry corresponding to said new entry may be added also to the common data structure of said first node. In the latter case the common data structures include state information of the complete cluster, i.e. also the entries representing state information needed for handling sets of data packets handled in said node in addition to the entries representing state information needed for handling sets of data packets handled in other nodes of the network element cluster.

The state information or the certain field(s) used for determining distribution identifiers may comprise the source address field and/or the destination address field of an Internet Protocol (IP) header, and/or port header fields of a Transmission Control Protocol (TCP) header and/or port header fields of a User Datagram Protocol (UDP) header, and/or the identifier header field of an Internet Control Message Protocol (ICMP) header, and/or a Message Identifier (MID) field of an Internet Security Association and Key Management Protocol (ISAKMP) header, and/or an Initiator Cookie (IC) field of an ISAKMP header, and/or the Security Parameter Index (SPI) field of a security header relating to the IPSec protocol suite, and/or a Session ID field relating to the Secure Sockets Layer (SSL) protocol, and/or an HTTP Cookie field relating to the HyperText Transfer Protocol (HTTP). Further the state information may comprise information identifying an authenticated entity and/or information identifying a secured tunnel, within which data packets of the corresponding set are tunneled. For example the value of the SPI field mentioned above, remains constant for all data packets relating to a certain IPSec tunnel. This SPI field indicates to which security association, i.e. to which secured tunnel, the data packet is related. Processing of IPSec data packets is impossible without the SPI value, since SPI is the key for finding the encryption keys and methods which have been negotiated between the communicating parties beforehand. One SPI value may concern a plurality of connections.

The packet data connections discussed here are typically packet data connections on IP protocol. In this specification and in the appended claims, the term "packet data connection" refers here to a bi-directional flow of data packets. Examples of such packet data connections are TCP connections, bi-directional UDP packet flows, UDP queries, ICMP queries and replies, and connections according to various protocols operating on top of TCP or UDP.

In this specification and in the appended claims, the term entry refers to a piece of information relating to one set of data packets. An entry typically comprises information at least about data packet headers. The term "set of data packets" on the other hand refers to data packets, which are related to each other, such as data packets of a packet data connection, data packets of a communication session comprising a plurality of packet data connections, data packets of a plurality of packet data connections of a secure tunnel, or any other suitable set of data packets. The terms "state data structure", "node-specific data structure" or "common data structure" refer to a data structure, whose entries represent sets of data packets handled in a network element. Such data structures may be, for example, a table or a linked list or any other more versatile data structure.

BRIEF DESCRIPTION OF THE DRAWING

The invention is now described in more detail with reference to the accompanying drawing, where.

DETAILED DESCRIPTION OF THE INVENTION

Figure 1A:
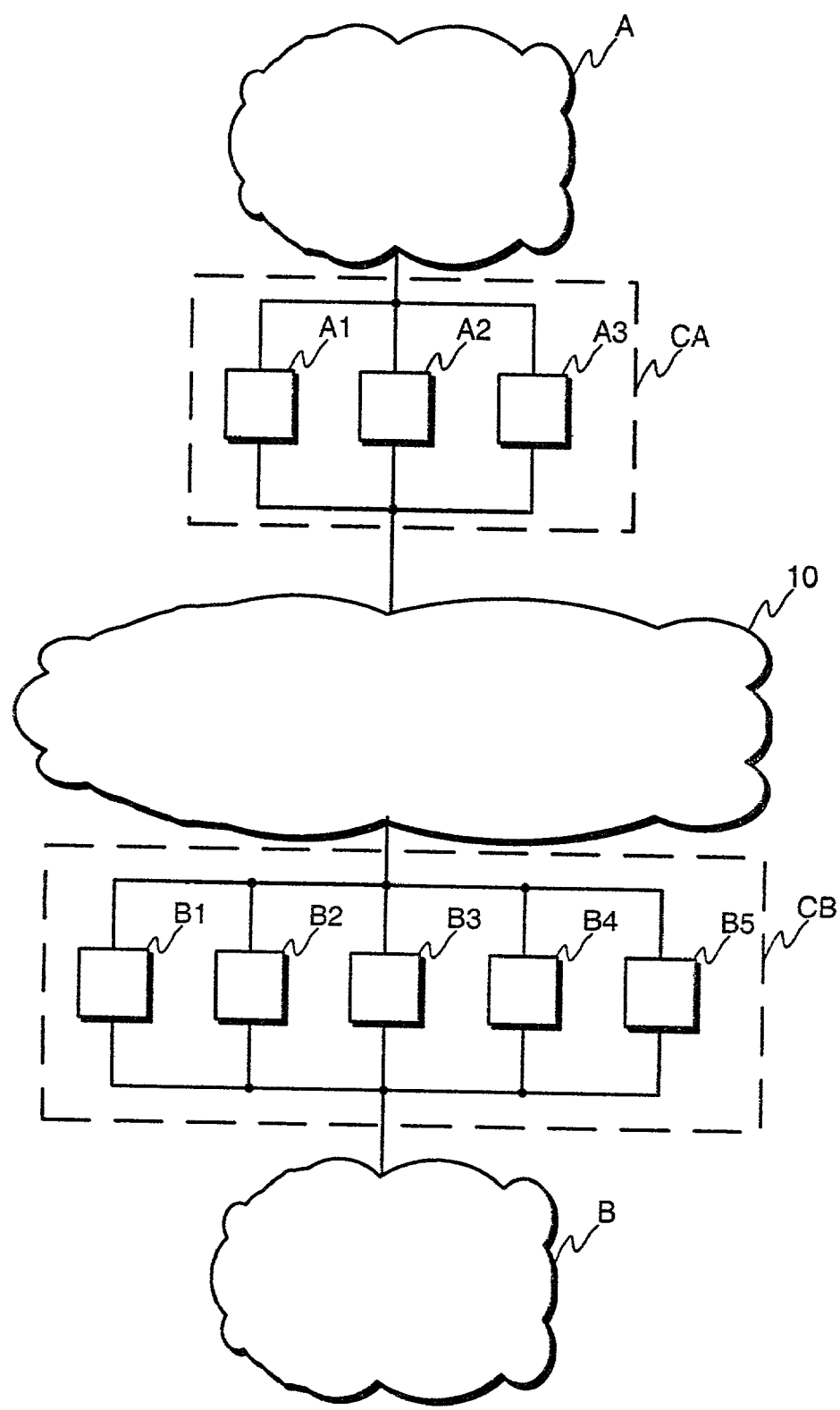
FIG. 1A illustrates two internal networks connected to a public network via security gateways.
Figure 1B:
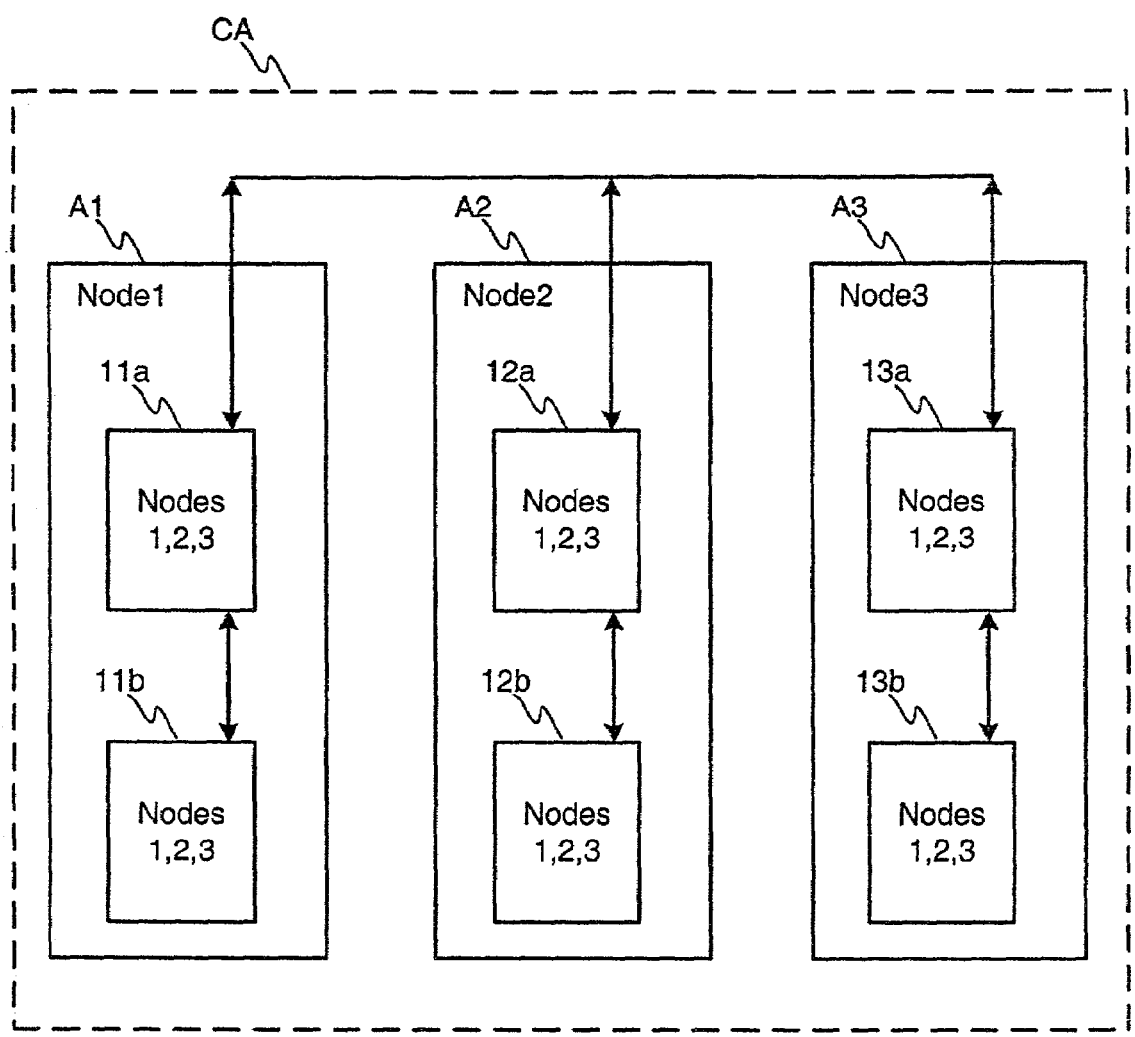
FIG. 1B illustrates as an example prior art state data structures of a network element cluster.

FIGS. 1A and 1B are discussed in more detail above in connection with the prior art description.

Figure 2:
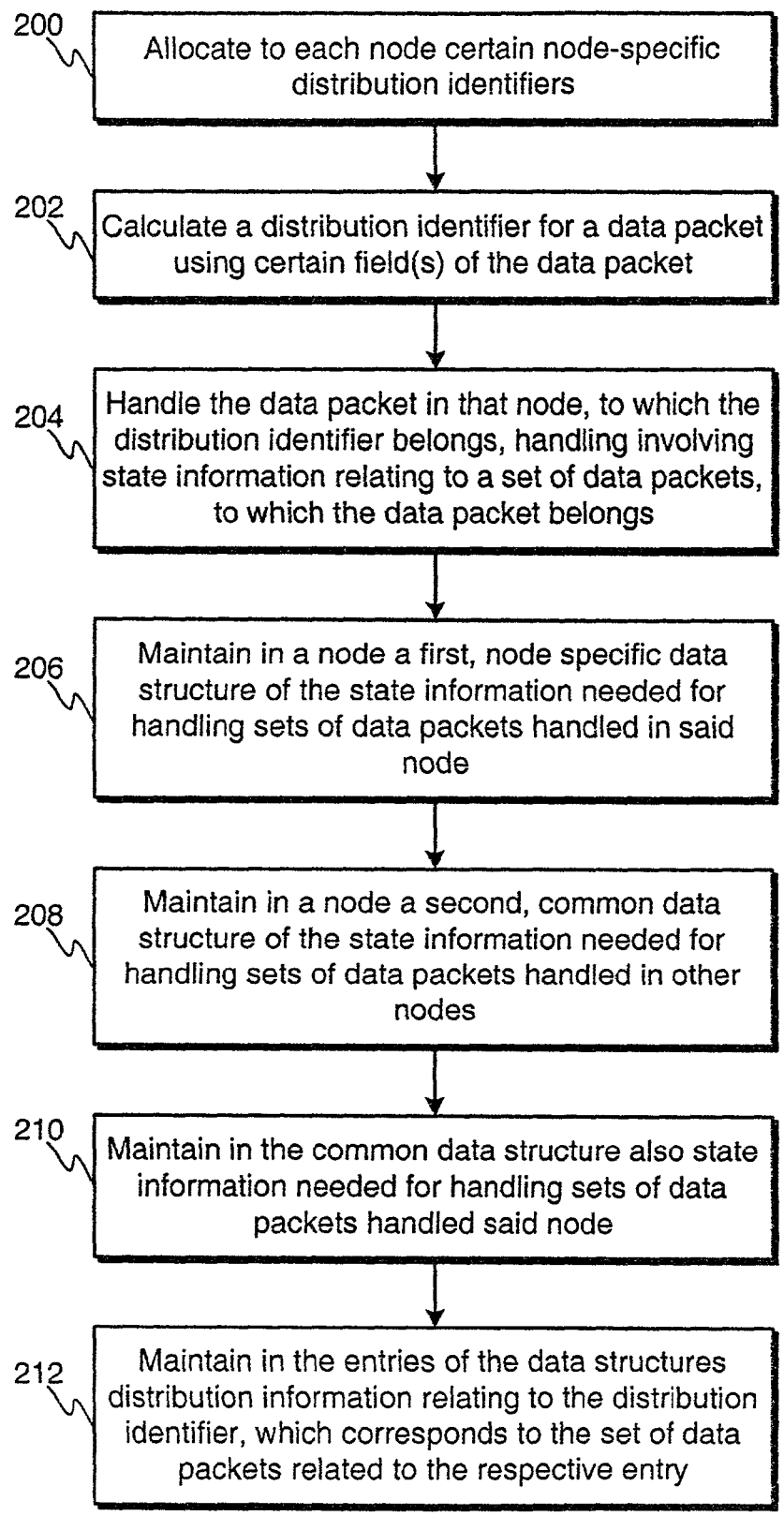
FIG. 2 illustrates as an example a flowchart of a method according to the invention.

FIG. 2 illustrates as an example a flowchart of a method according to the invention, which is a method for handling dynamic state information used for handling data packets, which arrive at a network element node of a network element cluster, said network element cluster having at least two nodes and each node handling separate sets of data packets. In step 200 to each node belonging to said network element cluster is allocated certain node-specific distribution identifiers. Separate node-specific distribution identifiers are allocated to each node and typically the distribution identifiers form a range of distribution identifiers. In other words, the nodes do not have common distribution identifiers, and the union of the distribution identifiers of all nodes forms the range of distribution identifiers. Distribution identifiers are determined for data packets arriving at the cluster on the basis of some field(s) of the arriving data packets. The distribution identifiers are determined so that all data packets of one set of data packets result in the same distribution identifier. Data packets are then distributed to the nodes having the corresponding distribution identifier allocated to them.

The number of distribution identifiers allocated to a node may vary from node to node, and if a certain node is for example out of service, the number of distribution identifiers allocated to that node is zero. Typically the overall number of the distribution identifiers is selected so that it is considerably larger than the number of nodes in a network element cluster. This way load balancing may be provided between the nodes of the network element cluster. For example, 256 distribution identifiers may be suitable for a few nodes in a network element cluster.

In step 202 a distribution identifier is calculated for a data packet using certain field(s) of said data packet, and in step 204 the data packet is handled in that node of said network element cluster, to which node the distribution identifier belongs. That is, at least a plurality of data packets is handled so that a data packet is handled in that node of said network element cluster, to which node a distribution identifier calculated using certain field(s) of said data packet is allocated.

The sets of data packets may be distributed to the nodes of the cluster for example by means of hash values, that is the distribution identifier may be a hash value. A hash value is obtained by a hash function. A hash function h is a function mapping a certain domain to a certain range, where the size of the range is typically much less than the size of the domain. A typical feature of a hash function is that it distributes input values, which are close to each other in the domain, evenly to the range. Therefore small changes in the input values may result in large changes in the corresponding hash values. A hash function h applicable in distributing a data packet in accordance with the invention is, for example, a hash function mapping a domain of $2^{64}$ values or a domain of $2^{32}$ values into a range of $2^8$ values.

In step 206 a first, node-specific data structure comprising entries representing state information needed for handling sets of data packets handled in said node is maintained, and in step 208 a second, common data structure comprising at least entries representing state information needed for handling sets of data packets handled in one other node of said network element cluster is maintained in addition to said node-specific data structure. Typically entries representing state information needed for handling sets of data packets handled in all other nodes of said cluster are maintained in the common data structure. Further in step 210, entries representing state information needed for handling sets of data packets handled in said node are maintained in said common data structure of said node. In other words, typically entries representing state information needed for handling all sets of data packets handled in the cluster are maintained in the common data structure of all nodes, i.e. the entries of node-specific data structures of all nodes of the cluster. Nevertheless, it is not required to maintain all entries in common data structures of all nodes: the entries of a node's own node-specific data structure do not need to be maintained in the node's common data structure. Additionally or alternatively, a backup node (or nodes) may be selected for each node, and the entries of a node's node-specific data structure may be maintained only in the common data structure of the backup node(s).

Typically said common connection data structure is maintained in user space, whereas the node-specific connection data structure needs to be maintained in kernel space or some other performance and/or resource critical storage means. The node-specific data structure may be called also as an active data structure, as it is the data structure, which is used when data packets are handled in a node and in which new entries are typically added or old entries cleared. The common data structure can be considered as a background data structure needed for dynamically altering the node-specific data structures due to e.g. load balancing.

In step 212 in a plurality of entries of said node-specific and common data structures is maintained distribution information relating to the distribution identifier, which corresponds to the set of data packets related to the respective entry. This step makes it possible to identify to which node a particular entry in the node-specific and common data structures may belong at a given moment in time. This is a key element for making it possible to implement the invention. Since there is knowledge of the grounds of distributing sets of data packets to different nodes, it is possible to keep track which entries belong to which node even if distribution of the sets of data packets varies dynamically.

Figure 3:
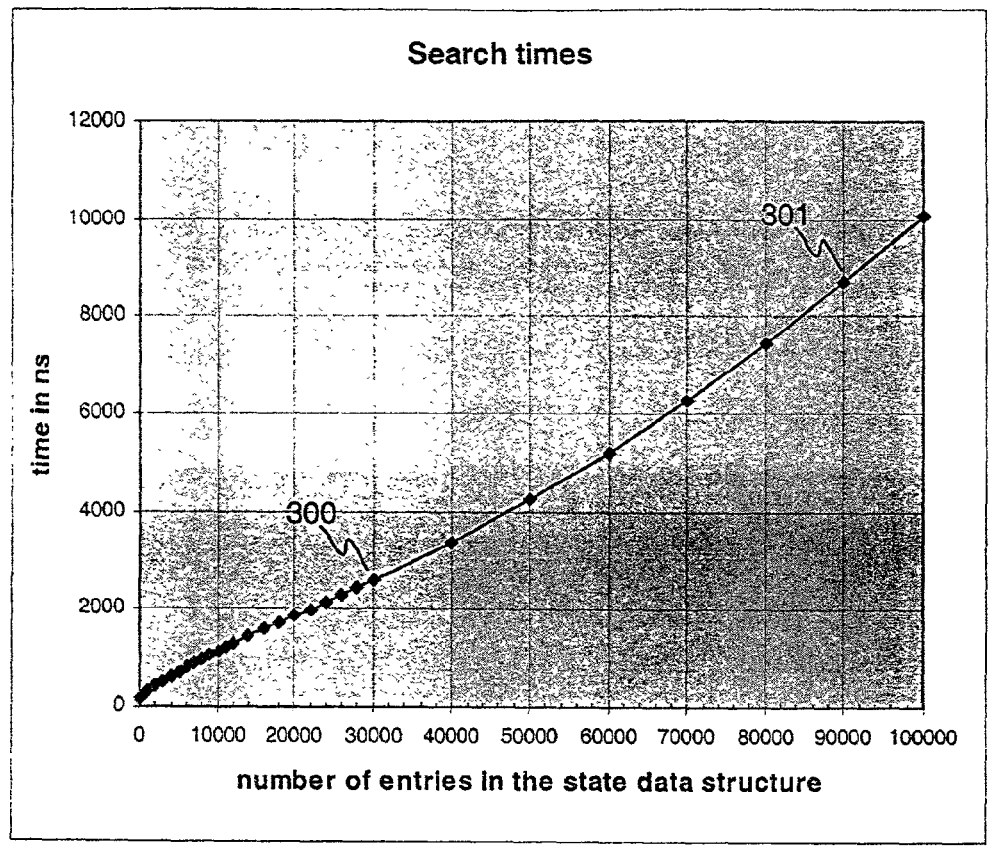
FIG. 3 illustrates a diagram of search times.

FIG. 3 illustrates a diagram of search times, that is time needed for finding a match for a given data packet in a state data structure as a function of the number of entries in the state data structure. Consider a cluster of three nodes, each requiring 30000 entries in a state data structure for handling the sets of data packets they are handling. At point 300 it is seen that if there are 30000 entries in a state data structure it takes 2576 ns to perform one search in the state data structure. However, if each node is required to maintain the entries of all nodes in their active state data structure (the data structure that is used for handling data packets), they are required to maintain 90000 entries. At point 301 it is seen that with 90000 entries in a state data structure one search takes 8718 ns, which is substantially longer than the time needed for a search within 30000 entries. Thus it is clear that the invention improves the performance of the nodes of the network element cluster, since the active state data structure in a given node needs to include only the entries representing the state information needed for handling the sets of data packets handled in that particular node. Additionally, the size of the active state data structure may be limited, which results in prior art solutions to limiting the number of the nodes in a cluster. In the invention, the size of the active state data structure does not limit the number of the nodes. The only thing that might be limited by the size of the active state data structure is the number of the sets of data packets handled in one node, but typically this is not a problem.

The invention has also other features that improve the performance. For example, in prior art entries are conveyed rather frequently from the data structure in user space to the active data structure in kernel space. For this time the active data structure needs to be locked for the process of conveying the entries in order not to mix the entries in the active data structure. In the invention, conveying entries from the common data structure to the active node-specific data structure takes place less frequently (in practice entries need to be conveyed only during reallocation), and thus the active data structure needs to be locked less frequently and the performance is improved.

Figure 4:
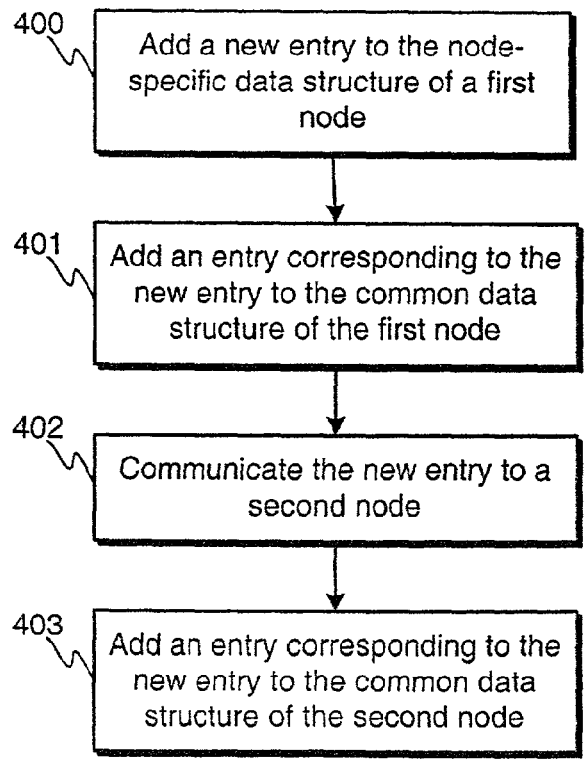
FIG. 4 illustrates as an example a flowchart of a method adding entries to the state data structures, FIGS. 5 A–B illustrates as examples state data structures according to the invention, FIGS. 6 A–B illustrates as examples flowcharts of a method for reallocating distribution identifiers.

FIG. 4 illustrates as an example a flowchart of a method adding entries to the state data structures. In general, a new entry representing state information related to a set of data packets is added to a state data structure as a first data packet of the set of data packets is handled. The state data structure entry is then used for handling the other data packets of the set of data packets. After handling all data packets of the set, the corresponding entry is cleared from the state data structure. It is well known how to determine which data packets cause adding a new entry and which are handled according to the state data structure. For example, a data packet may be compared against entries in a state data structure and if a corresponding entry is not found a new entry needs to be made. If a corresponding entry is found the data packet is handled accordingly. Additionally, it is possible to perform a further check whether the new entry would be allowable e.g. on the basis of rules, before adding the new entry in the node-specific data structure. Furthermore, some data packets may require special handling and/or special entries in the state data structure. For example a specific separate code portion may be required for handling some set of data packets and such code portion may create to the state data structure new entries for some other set of data packets on the basis of data packets it is handling. Creating an entry for FTP data connection on the basis of related FTP control connection is an example of such handling of data packets. Such handling of data packets is however beyond the scope of this invention and is not addressed here any further. Considering the invention it is irrelevant on what basis an entry is added or cleared in a state data structure, since the invention does not concern determining the entries, but rather handling existing entries.

In step 400 of FIG. 4 a new entry is added to the node-specific data structure in a first node. The node-specific data structure is the state data structure that is used for processing data packets, and from the processing point of view it is irrelevant whether there is another state data structure somewhere or not. As long as the entries representing the state information needed for handling the sets of data packets handled in said node are available in the node-specific data structure, the processing of data packets is flexible. In step 401 an entry corresponding to said new entry is added to the common data structure of said first node. This step is optional, and may be ignored depending on the implementation. Then, in step 402 said new entry is communicated at least to a second node of the network element cluster, and an entry corresponding to said new entry is added to the common data structure of said second node in step 403. Typically the entries are communicated to all other nodes of the cluster. If an entry is cleared in the node-specific data structure, steps similar to steps 401–403 are performed, with the distinction that now information about the cleared entry is communicated and a corresponding entry is cleared in the common data structure(s).

On the basis of above description it is clear that the common data structure of a node includes the entries of the node-specific data structure of at least some other node of the cluster, and typically of all other nodes. Additionally the common data structure of a node may include the entries of the node's own node-specific data structure, and thus entries representing state information needed for handling the sets of data packets handled in the whole cluster. For the normal operation of the node, the common data structure does not have any meaning, but in the situation of dynamically changing the allocation of the distribution identifiers in the nodes, the node-specific data structures of the nodes need to be modified accordingly, and the common data structure is maintained for this purpose as will be evident on the basis of description given later in this document.

Typically an entry to a state data structure is determined in the node that handles the corresponding set of data packets. Nevertheless, it is possible that an entry belonging to a first node is determined in a second node. For example an FTP control connection may be handled in the second node, whereas a corresponding FTP data connection is handled in the first node. When a state data structure entry for the data connection is determined in the second node, it is detected on the basis of knowledge of the details of the data connection, distribution identifiers and grounds for determining distribution identifiers that the FTP data connection (set of data packets of the FTP data connection) is handled in some other node. The second node may be capable of detecting, that it is the first node that will handle the data connection, or it may simply detect that the data connection is handled by some other node than the second node, i.e. that the distribution identifier of the data connection does not belong to the second node. Therefore the new entry corresponding to the FTP data connection is not added to the node-specific data structure of the second node, but the entry is communicated to the other nodes of the cluster. Other nodes then need to detect if the entry belongs to them, i.e. if they have the corresponding distribution identifier, and if so to add a corresponding entry in their node-specific data structure and possibly also to their common data structure. Otherwise the other nodes typically add a corresponding entry to their common data structure. Additionally, a corresponding entry is typically added to the common data structure of the second node.

If the second node knows that it is the first node that will handle the data connection, it is possible to communicate the new entry only to the first node, which then adds a corresponding entry to its node-specific data structure. Furthermore, it is possible that a corresponding entry is added also to the common data structure of the first node. Typically, the entry is communicated also to all other nodes of the cluster either from the second node or from the first node.

Figure 5A:
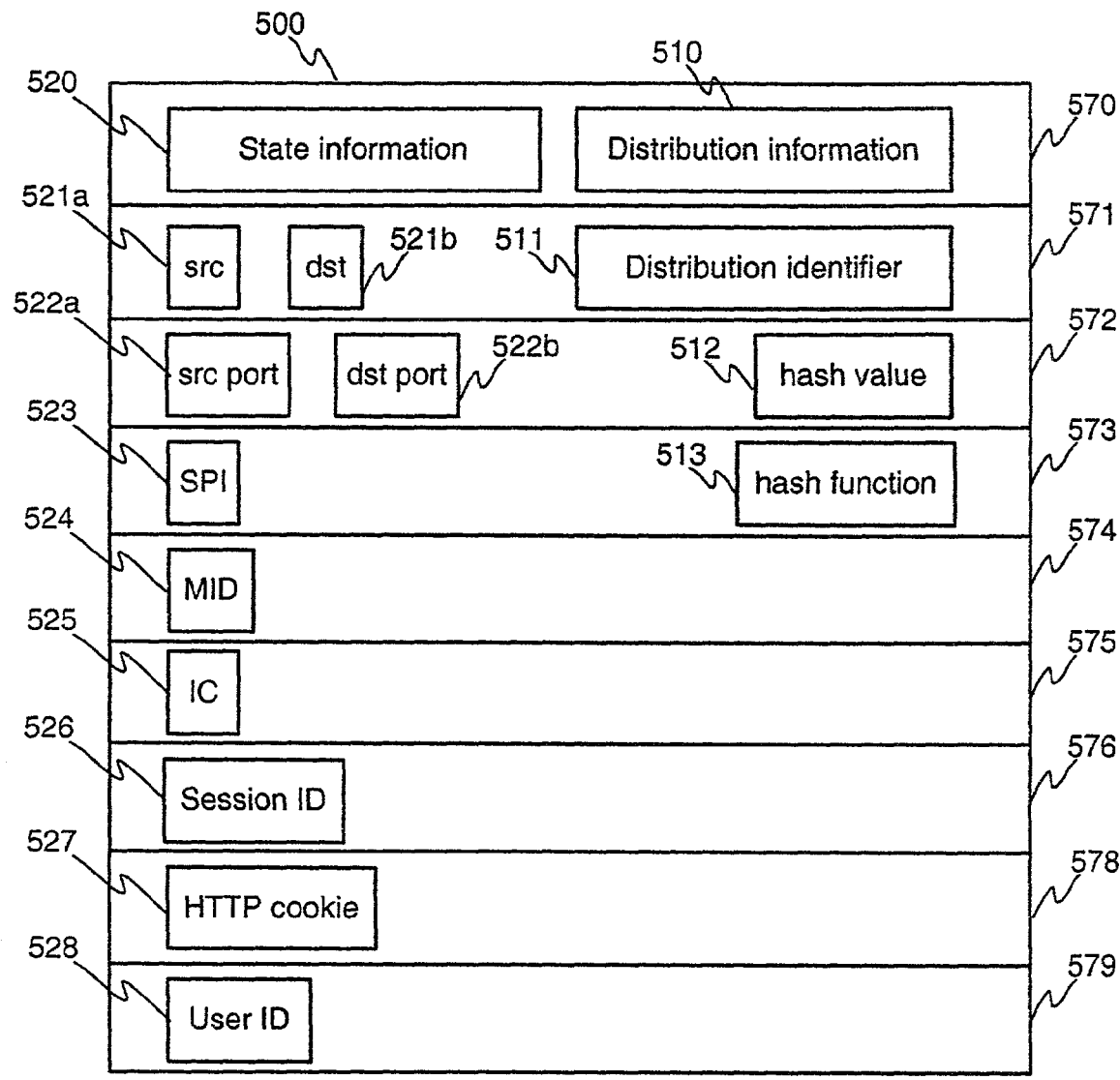

FIG. 5 illustrates as examples state data structures according to the invention. FIG. 5A illustrates as an example a general state data structure 500 according to the invention. Various different entries 570–579 comprising different types of information that may be included in a state data structure are presented as examples. The information presented in different entries may be combined or interleaved. In general, an entry according to the invention includes state information 520 and distribution information 510 as in entry 570. The state information 520 may be the source address field 521a and/or the destination address field 521b of an IP header, and/or port header fields 522a, 522b of a TCP or UDP header presented in entries 571 and 572 respectively. The state information may also include the identifier header field of an ICMP header. Further possibilities are the SPI field 523 of a security header relating to the IPSec protocol suite, a Message Identifier field 524 of an ISAKMP header, an Initiator Cookie field 525 of an ISAKMP header, a Session ID field 526 relating to the SSL protocol, and/or an HTTP Cookie field 527 relating to the HTTP Protocol presented in entries 573–578. Still further the state information 520 may be user ID 528 identifying an authenticated entity. Also other additional information may be included in the state information 520. The additional information may specify e.g. NAT (Network Address Translation) details, encryption keys and methods related to a secure tunnel (or to a SPI value), routing information and/or a program code, which is used to investigate and optionally modify the contents of a data packet.

The distribution information 510 is advantageously the distribution identifier as in entry 571. Alternatively the distribution information 510 may be a hash value 512 or a hash function 513 presented in entries 572 and 573 respectively. Typically if the distribution information is a hash function, the input needed for the hash function is found in the state information part of the entry. Also in other cases, it is possible that the distribution information is readily incorporated in the state information, so that the corresponding distribution identifier can be found out on the basis of the state information of an entry. Nevertheless, it is advantageous to include the actual distribution identifier in order to obtain better performance, since for example calculating the distribution identifiers every time the distribution identifiers are reallocated may require a lot of processing resources.

Figure 5B:
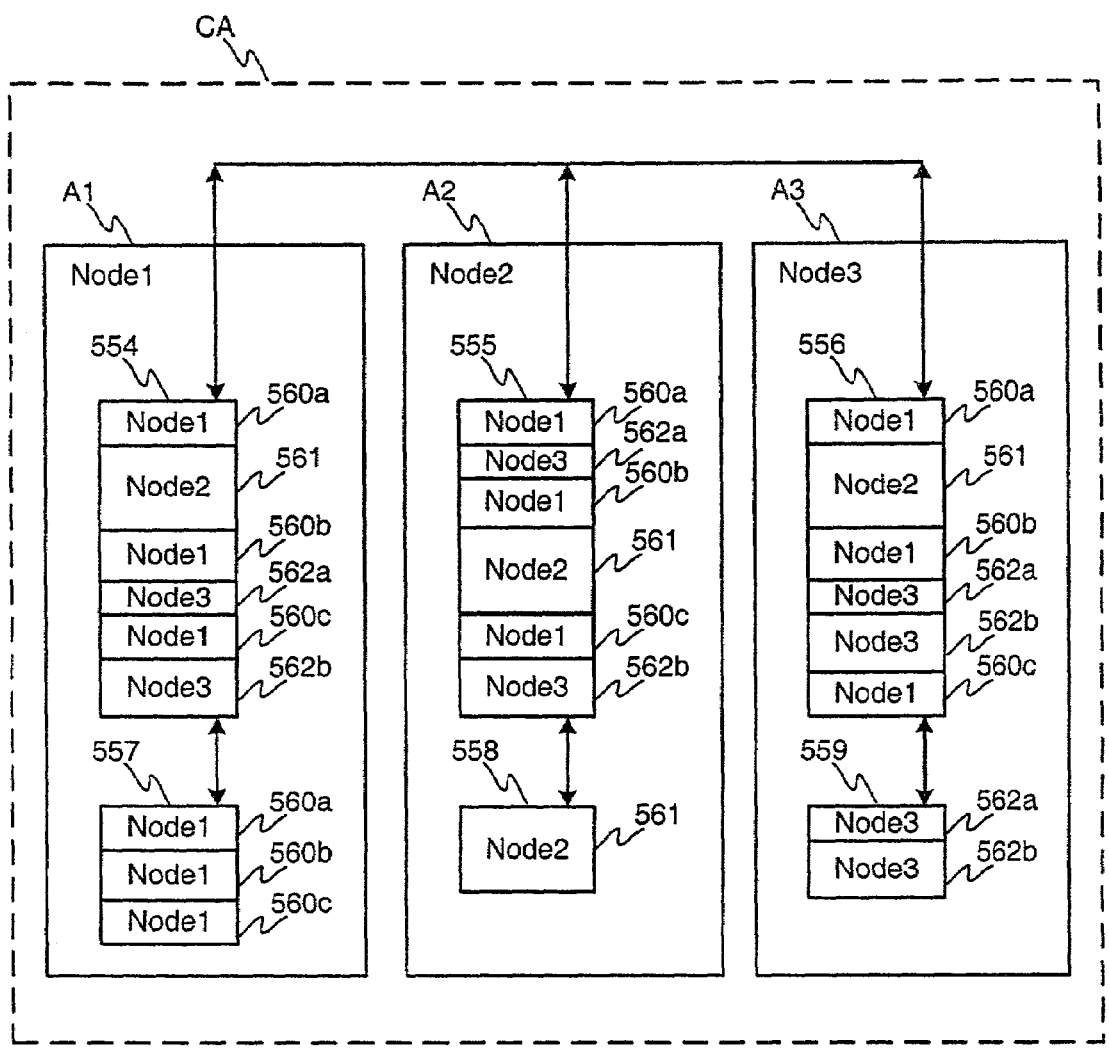

FIG. 5B illustrates node-specific and common data structures in nodes Node1, Node2 and Node3 or respectively A1, A2 and A3 of a network element cluster CA. The entries in the node-specific and common data structures may be for example such as presented in connection with FIG. 5A. The network element cluster may be for example the network element cluster of FIG. 1. In each node Node1, Node2 and Node3 there are maintained respectively common data structures 554, 555 and 556 having identical contents and distinctive node-specific data structures 557, 558 and 559. The node-specific data structures include entries belonging to the corresponding node at a given moment of time. The common data structures include entries of the node-specific data structures of all nodes. The entries in the common data structures do not need to be arranged and the order of entries may vary from one node to another. Node1 has the entries of its node-specific data structure in three parts 560a, 560b and 560c in its common data structure. Each part 560a, 560b and 560c may include a plurality of entries. These entries happen to be in three parts also in the common data structures of Node2 and Node3. Node2 has the entries of its node-specific data structure in one part 561 in its common data structure. These entries happen to be in one part also in the common data structures of Node1 and Node3. Node3 has the entries of its node-specific data structure in one part 562a, 562b in its common data structure. In the common data structures of Node1 and Node2 these entries are however in two parts.

The nodes Node1, Node2 and Node3 are provided with the ability to communicate information between the common data structures of other nodes and between their own common and node-specific data structures. The common data structures change dynamically in time responsive to adding new entries or clearing old entries in the node-specific data structures due to handling sets of data packets as was explained in more detail in connection with FIG. 4. Whereas node-specific data structures change dynamically in time due to handling sets of data packets, and also due to reallocation of distribution identifiers as is explained in more detail in connection with FIG. 6. The state data structures of the nodes are presented as examples only and it should be clear that it is possible to implement the state data structures also in some other way within the scope of the invention.

Figure 6A:
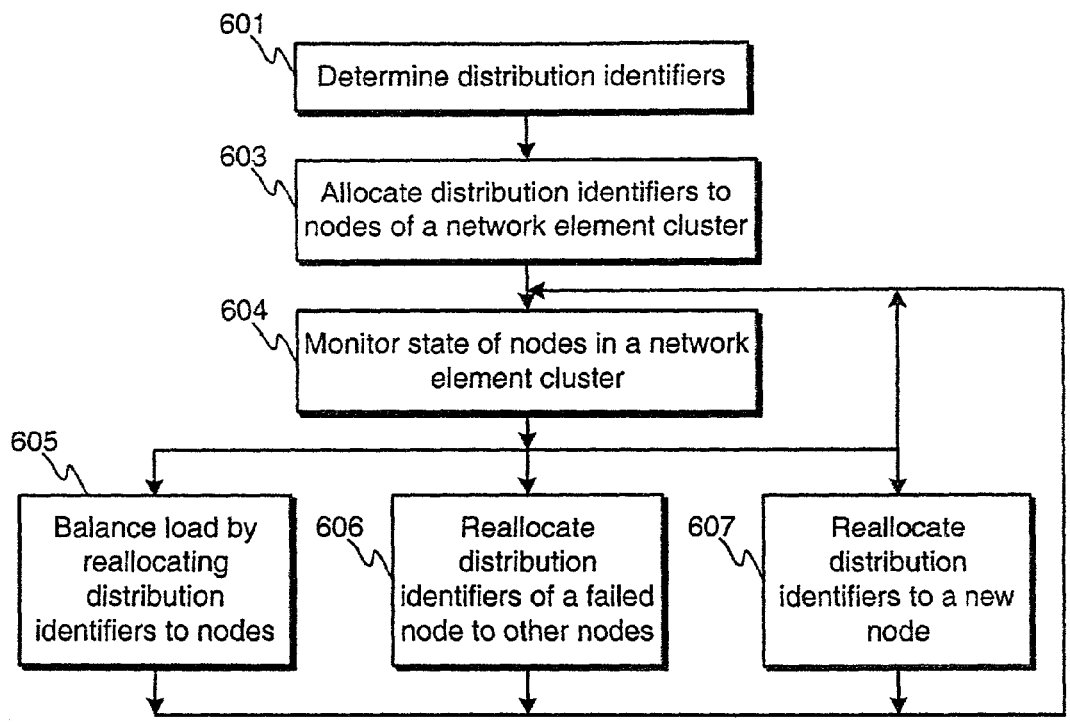

FIG. 6 illustrates as examples flowcharts of a method for reallocating distribution identifiers. FIG. 6A illustrates a flowchart for allocating/reallocating distribution identifiers in a network element cluster. In step 601 suitable distribution identifiers are determined. Typically distribution identifiers form a range of distribution identifiers; the total number of distribution identifiers typically depends on the number of nodes in a network element cluster. In the same time suitable grounds for calculating distribution identifiers are selected. Thus the step 601 may involve for example determining a range of hash values, selecting suitable hash functions, and/or selecting suitable fields of data packets for calculating distribution identifiers. As discussed above, it is possible to use various fields used for this purpose. Further suitable grounds for calculating distribution identifiers may be data-packet-type specific, i.e. different grounds are determined for different types of data packets. In step 603 the distribution identifiers are allocated to nodes of the network element cluster. The number of distribution identifiers allocated to each node may be node-dependent, or it may be the same for all nodes. Typically steps 601 and 603 are carried out in designing or configuring a network element cluster for example in a management element outside the actual network element cluster.

In step 604, which is carried out when the network element cluster is in function, the state of at least some of the nodes of the network element cluster is monitored. Typically the number of secure tunnels in a node or the current load in a node may be monitored. The monitoring may be carried out, for example, periodically. If there is need to balance load between nodes, in step 605 the distribution identifiers are reallocated to nodes accordingly. Typically, part of distribution identifiers previously allocated to a node, which has more load than other nodes, may be reallocated to other nodes. If a node is down, i.e. it is not operational, the distribution identifiers allocated to that node may be reallocated to other nodes in step 606. Furthermore, if a node is up again or if new nodes are dynamically added to the network element cluster, some of the distribution identifiers are transferred from other nodes to a new node in step 607.

Figure 6B:
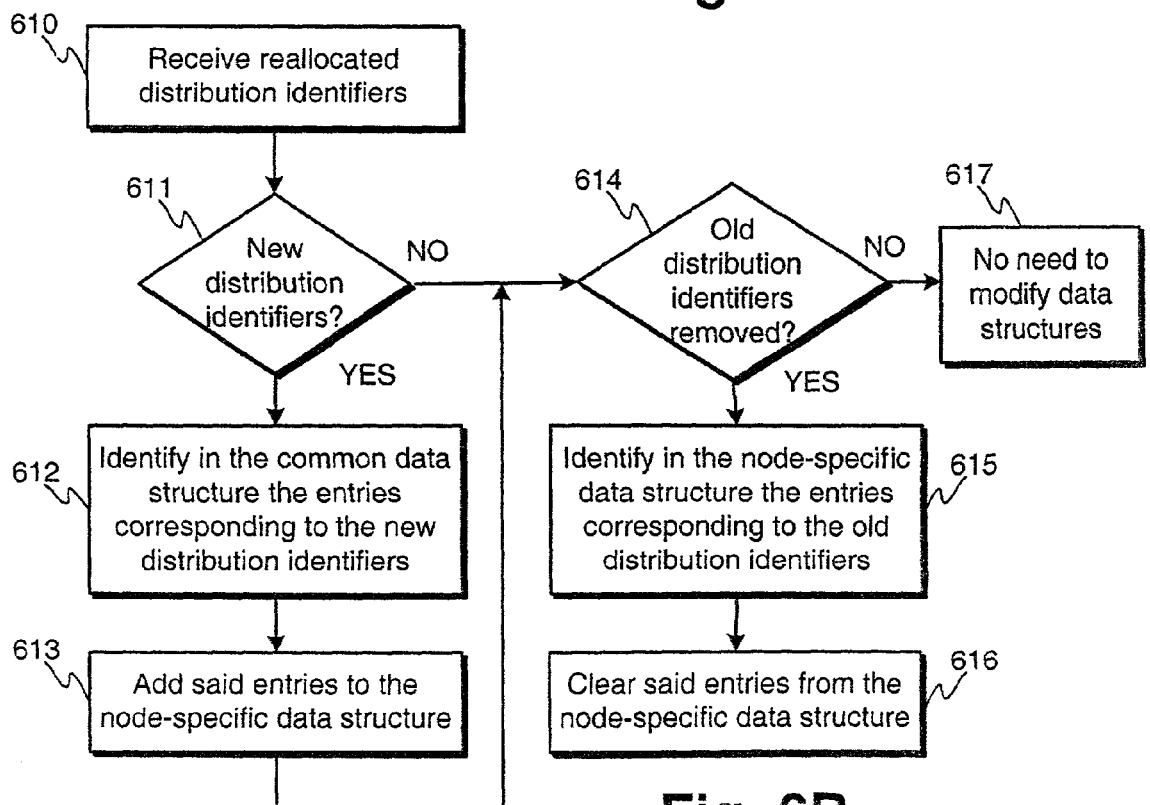

FIG. 6B illustrates a flowchart of steps performed in a node due to a reallocation of distribution identifiers in a network element cluster. If distribution identifiers are reallocated in a cluster for some reason (load balancing, new node, node crashing as discussed above), the node-specific data structures of nodes are updated on the basis of the distribution identifiers stored in the entries in the common data structures and the reallocation of the distribution identifiers. In step 610, the node receives information about the reallocation (reallocated distribution identifiers). If it is detected in step 611, that said reallocation results in new distribution identifiers being allocated to a node, the entries corresponding to said new distribution identifiers are identified in the common data structure of said node in step 612, and said entries are added to the node-specific data structure of said node in step 613. A new distribution identifier is a distribution identifier, which is allocated to said node at the time of receiving information about the reallocation. Depending on the implementation it may be possible to clear the entries mentioned above from the common data structure after adding them to the node-specific data structure. If it is detected in step 614, that said reallocation results in old distribution identifiers not being allocated to a node anymore, the entries corresponding to said old distribution identifiers are identified 615 in the node-specific data structure of said node, and said entries are cleared from the node-specific data structure of said node. An old distribution identifier is a distribution identifier, which is allocated to said node at the time of receiving information about the reallocation. If there are no new distribution identifiers allocated to or no old distribution identifiers removed from a node, there is no need to modify state data structures in the node (step 617). Typically, the checks of steps 611 and 614 are done simultaneously.

In order to clarify the operation during reallocation of distribution identifiers let's consider a situation where distribution identifiers 1, 2 and 3 are initially allocated to a node 1 and distribution identifiers 4 and 5 to a node 2. Due to load balancing the distribution identifier 3 needs to be reallocated to the node 2, and consequently the sets of data packets relating to the distribution identifier 3 need to be transferred to the node 2. The node 2 receives information about the reallocation and thus the entries corresponding to the distribution identifier 3 are searched for in the common data structure of the node 2 and the corresponding entries of the common structure are added to the node-specific data structure of the node 2. Then distribution identifier 3 is actually reallocated to the node 2, i.e. the data packets relating to the distribution identifier 3 begin to be distributed to the node 2 instead of the node 1, and node 2 continues to handle the corresponding sets of data packets. After this the entries corresponding to the distribution identifier 3 are cleared from the node-specific data structure of the node 1. It is possible that there is a short break in handling the data packets arriving at the nodes during which none of the nodes owns the distribution identifier 3, but it is not likely that any connections fail because of this very short break and therefore this break or delay can be considered negligible.

The methods discussed above are presented as examples only. The details of methods employed in network element node and network element cluster in accordance with the invention may vary from those presented above. It is possible to combine the features presented in connection with different methods together. Additionally, it is not required to perform all the steps presented in the Figures in order to use the invention, but some of the steps may be optionally ignored. Furthermore, the order of the steps in Figures is not meant to be restrictive.

Figure 7:
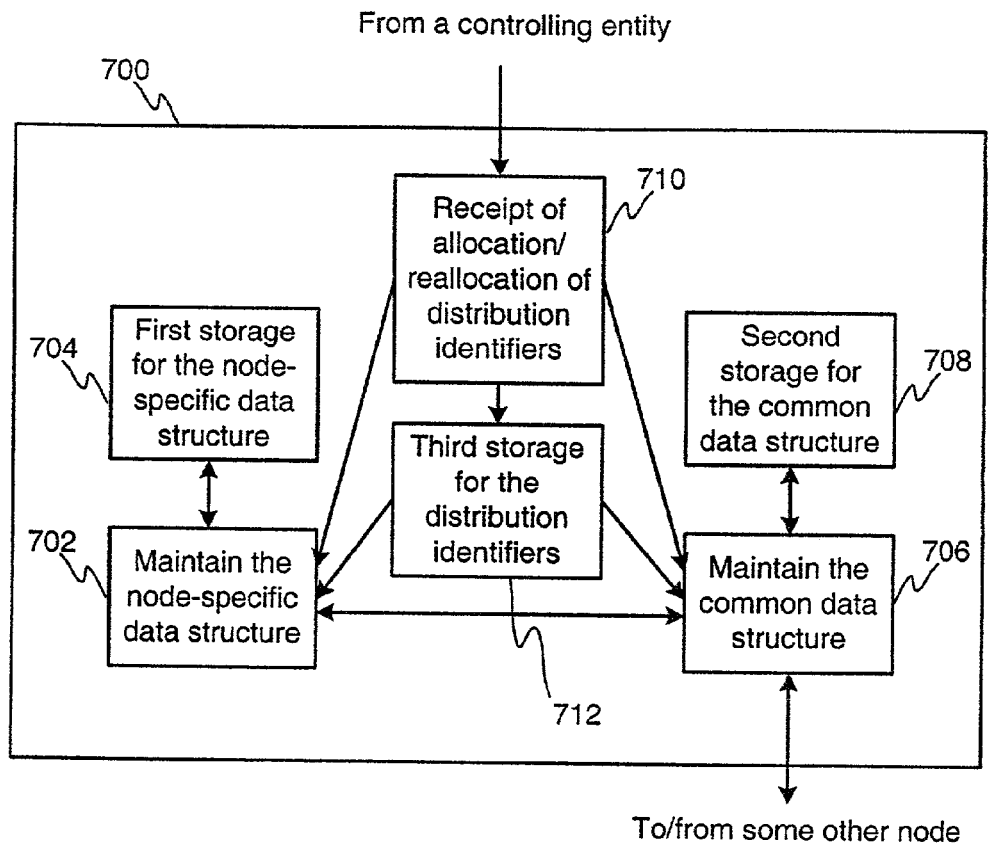
FIG. 7 illustrates as an example a network element node according to the invention.

FIG. 7 illustrates as an example a network element node 700 according to the invention. The network element node is one of the nodes of a network element cluster having at least two nodes. The node 700 comprises first storage means 704 for a first, node-specific data structure, and means 702 for maintaining the node-specific data structure in said first storage means 704. The node-specific data structure comprises entries representing state information needed for handling sets of data packets handled in said node. Further the node comprises second storage means 708 for a second, common data structure, and means 706 for maintaining the common data structure in said second storage means 708. The common data structure comprises at least entries representing state information needed for handling sets of data packets handled in one other node of said network element cluster. Typically the common data structure comprises entries representing state information needed for handling sets of data packets handled in any other node of said network element cluster. Furthermore, also entries representing state information needed for handling sets of data packets handled in said node may be included in the common data structure.

Advantageously said first storage means 704 may be a portion of kernel space memory and said second storage means 708 may be a portion of user space memory. Alternatively, said first storage means 704 may be for example a portion of content addressable memory or part of a cryptographic card. Furthermore it is possible that there is a first storage means both in kernel space memory and in content addressable memory. In that case a new entry representing state information related to a set of data packets is typically created to the first storage means in kernel space memory as a first data packet of the set of data packets is handled and the new entry is duplicated to the first storage means in content addressable memory. The entry in the content addressable memory is then used for handling the other data packets of the set of data packets.

In the network element node 700 the means 702 for maintaining the node-specific data structure are advantageously adapted to add a new entry to said node-specific data structure in said first storage means 704, and to communicate said new entry to said means 706 for maintaining common data structure. Typically, there is included some processing means (not shown in the Figure) for determining a new entry and handling data packets according to the state information represented by the entries of a state data structure. A new entry representing state information related to a set of data packets is added as a first data packet of the set of data packets is handled. The state data structure entry is then used for handling the other data packets of the set of data packets. Checking whether a new entry needs to be made when handling a data packet or an entry in a state data structure needs to be used for handling the data packet is not relevant with respect to the operation of the invention and may be done in any suitable way. It is trivial to a person skilled in the art to implement a method for such a check. For example, a data packet may be compared against entries in a state data structure and if a corresponding entry is not found a new entry need to be made. Additionally, it is possible to perform a further check whether the new entry would be allowable e.g. on the basis of rules, before adding the new entry in the node-specific data structure.

The means 706 for maintaining the common data structure are adapted to communicate said new entry at least to one other node of the network element cluster for an entry corresponding to the new entry to be added in the common data structure of said at least one other node. Typically, new entries are always communicated to all other nodes of the cluster. Accordingly, the means 706 for maintaining the common data structure are adapted to receive an entry from at least one other node of the network element cluster and to add an entry corresponding to said received entry to said common data structure in said second storage means 708. Typically, the means 706 for maintaining the common data structure are further adapted to add a new entry received from said means 702 for maintaining the node-specific data structure to said common data structure in said second storage means 708. That is, typically the common data structures of all nodes of a cluster are identical and include entries representing state information needed for handling set of data packets handled in the cluster at a given moment. An equal procedure to the procedure of adding an entry is conducted, if an entry is cleared from the node-specific data structure, e.g. due to having handled all data packets of a given set or due to certain time limit being exceeded. The only difference is that now information about the clearing an entry is communicated.

The network element node 700 further comprises means 710 for receiving distribution identifiers, which are currently allocated to said node, said distribution identifiers being used for handling at least a plurality of data packets so that a data packet is handled in that node of said network element cluster, to which node a distribution identifier calculated using certain field(s) of said data packet is allocated, and third storage means 712 for storing said distribution identifiers. The node may receive and store information about distribution identifiers of all nodes of the cluster or only the distribution identifiers allocated to said node, i.e. its own distribution identifiers. Knowledge of own distribution identifiers is enough, but in some cases it may be advantageous to have knowledge of all distribution identifiers and corresponding nodes. The means 702, 706 for maintaining the node-specific and common data structures are adapted to maintain in a plurality of entries of said node-specific and common data structures in said first and second storage means 704, 708 distribution information relating to the distribution identifier, which corresponds to the set of data packets related to the respective entry. The distribution information is used for identifying which entries "belong" to which node at a given moment as was explained earlier in this document.

Furthermore, the means 710 for receiving distribution identifiers are adapted to receive reallocated distribution identifiers. The means 706 for maintaining the common data structure are adapted to detect a new distribution identifier being allocated to said node due to the reallocation, said new distribution identifier being a distribution identifier not allocated to said node at the time of receiving reallocated distribution identifiers, and to identify in the common data structure the entries corresponding to said new distribution identifier, and to communicate said entries to said means 702 for maintaining the node-specific data structure for said entries to be added to the node-specific data structure. Accordingly, the means 702 for maintaining the node-specific data structure are adapted to detect an old distribution identifier not being anymore allocated to said node due to the reallocation, said old distribution identifier being a distribution identifier allocated to said node at the time of the reallocation, and to identify in the node-specific data structure the entries corresponding to said old distribution identifier, and to clear said entries from the node-specific data structure.

Figure 8:
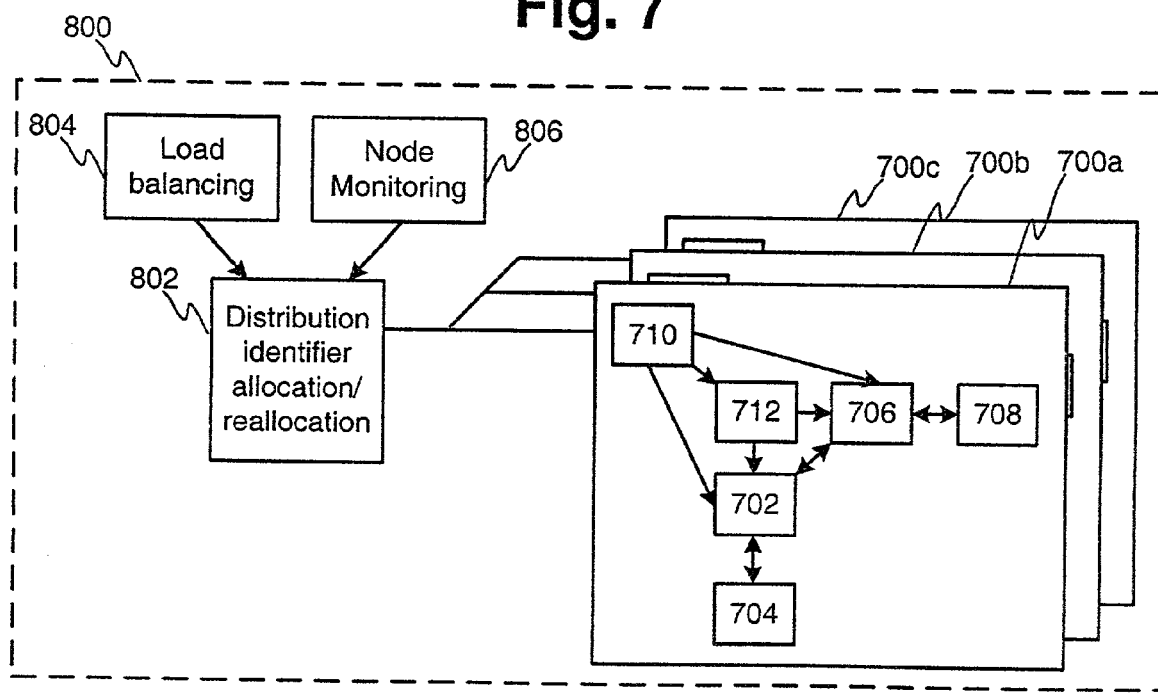
FIG. 8 illustrates as an example a network element cluster according to the invention.

FIG. 8 illustrates as an example a network element cluster 800 according to the invention. The network element cluster comprises a plurality of network element nodes 700a, 700b and 700c, which are provided with capability of communicating with each other. The nodes 700a, 700b and 700c are in accordance with the node of FIG. 7. There has to be at least two nodes, but there is no upper limit to the number of nodes. The nodes 700 comprise first storage means 704 for a first, node-specific data structure, and means 702 for maintaining the node-specific data structure in said first storage means 704. The node-specific data structure comprises entries representing state information needed for handling sets of data packets handled in said node. Further the nodes comprise second storage means 708 for a second, common data structure, and means 706 for maintaining the common data structure in said second storage means 708. The common data structure comprises at least entries representing state information needed for handling sets of data packets handled in one other node of said network element cluster. Typically the common data structure comprises entries representing state information needed for handling sets of data packets handled in any other node of said network element cluster. Furthermore, also entries representing state information needed for handling sets of data packets handled in said node may be included in the common data structure.

Further the means 702 for maintaining the node-specific data structure in the nodes are advantageously adapted to add a new entry to said node-specific data structure in said first storage means 704, and to communicate said new entry to said means 706 for maintaining common data structure. The means 706 for maintaining the common data structure are adapted to communicate said new entry at least to one other node of the network element cluster for an entry corresponding to the new entry to be added in the common data structure of said at least one other node. Typically, new entries are always communicated to all other nodes of the cluster. Accordingly, the means 706 for maintaining the common data structure are adapted to receive an entry from at least one other node of the network element cluster and to add an entry corresponding to said received entry to said common data structure in said second storage means 708. Typically, the means 706 for maintaining the common data structure are further adapted to add a new entry received from said means 702 for maintaining the node-specific data structure to said common data structure in said second storage means 708. That is, typically the common data structures of all nodes of a cluster are identical and include entries representing state information needed for handling set of data packets handled in the cluster at a given moment. An equal procedure to the procedure of adding an entry is conducted, if an entry is cleared from the node-specific data structure, e.g. due to having handled all data packets of a given set or due to certain time limit being exceeded. The only difference is that now information about the clearing an entry is communicated.

The network element cluster 800 further comprises means 802 for allocating/reallocating to each node belonging to said network element cluster certain node-specific distribution identifiers, each node having separate node-specific distribution identifiers allocated to it, said distribution identifiers being used for handling at least a plurality of data packets so that a data packet is handled in that node of said network element cluster, to which node a distribution identifier calculated using certain field(s) of said data packet is allocated. The cluster further includes means 804 for load balancing and means 806 for node monitoring, which provide input for determining allocation/reallocation of distribution identifiers. Allocation/reallocation of distribution identifiers was above discussed in more detail. Means 802, 804 and 806 may be implemented as a part of one of the nodes or they may be included in a separate device.

The nodes of the cluster 800 further comprise means 710 for receiving distribution identifiers, which are currently allocated to said node, and third storage means 712 for storing said distribution identifiers. The means 702, 706 for maintaining the node-specific and common data structures in the nodes are adapted to maintain in a plurality of entries of said node-specific and common data structures in said first and second storage means 704, 708 distribution information relating to the distribution identifier, which corresponds to the set of data packets related to the respective entry.

The means 706 for maintaining the common data structure are adapted to detect a new distribution identifier being allocated to said node due to the reallocation, said new distribution identifier being a distribution identifier not allocated to said node at the time of receiving reallocated distribution identifiers, and to identify in the common data structure the entries corresponding to said new distribution identifier, and to communicate said entries to said means 702 for maintaining the node-specific data structure for said entries to be added to the node-specific data structure. Accordingly, the means 702 for maintaining the node-specific data structure are adapted to detect an old distribution identifier not being anymore allocated to said node due to the reallocation, said old distribution identifier being a distribution identifier allocated to said node at the time of the reallocation, and to identify in the node-specific data structure the entries corresponding to said old distribution identifier, and to clear said entries from the node-specific data structure.

The means mentioned in connection with FIGS. 7 and 8 or in the appended claims, are typically implemented as a suitable combination of hardware and software. They are advantageously implemented using software program code means executed by a processor unit in combination with suitable memory resources. A network element node or a network element cluster according to the invention may employ any method according to the invention. Some examples of such methods are described above. The network element node and network element cluster presented here give just examples of the implementation of the invention and are not meant to be restrictive. It is clear that the structure of nodes and clusters in accordance with the invention may vary.

In the view of the foregoing description it will be evident to a person skilled in the art that various modification may be made within the scope of the invention. It should be apparent that many modifications and variations to the examples described above are possible, all of which fall within the true spirit and scope of the invention.

The invention claimed is:

1. A method for handling dynamic state information used for handling data packets, which arrive at a network element node of a network element cluster, said network element cluster having at least two nodes and each node handling separate sets of data packets, said method comprising:

maintaining in a first node a first, node-specific data structure comprising entries representing state information needed for handling sets of data packets handled in said first node, said sets of data packets handled in said first node being different from sets of data packets handled in any other node of said network element cluster, and each set of data packets containing data packets related to each other, maintaining in said first node in addition to said node-specific data structure a second, common data structure comprising at least entries representing state information for data packets handled in at least one other node of said network element, cluster, the contents of said common data structure effectively differing from the contents of said node-specific data structure and including copies of all state information entries maintained in a node-specific data structure of said at least one other node and needed for handling sets of data packets in said at least one other node, said entries being maintained according to information on how different sets of data packets are distributed among the nodes of the network element cluster, dynamically changing distribution of at least one set of data packets from said at least one other node to said first node in the network element cluster, and providing said first node with respective changed distribution information, in response to said changed distribution information, selecting the state information entries of at least one re-distributed set of data packets from said second common data structure and transferring them to said first node specific data structure of said first node;

allocating to each node belonging to said network element cluster certain node-specific distribution identifiers, each node having separate node-specific distribution identifiers allocated to it, handling at least a plurality of data packets so that a data packet is handled in that node of said network element cluster, to which node a distribution identifier calculated using certain field(s) of said data packet is allocated, and maintaining in a plurality of entries of said node-specific and common data structures distribution information relating to the distribution identifier, which corresponds to the set of data packets related to the respective entry.

2. A method according to claim 1, further comprising:

reallocating said distribution identifiers to the nodes of said network element cluster, if said reallocation results in a new distribution identifier being allocated to a node, said new distribution identifier being a distribution identifier not allocated to said node at the time of the reallocation, identifying in the common data structure of said node the entries corresponding to said new distribution identifier, and adding said entries to the node-specific data structure of said node, and if said reallocation results in an old distribution identifier not being allocated to a node anymore, said old distribution identifier being a distribution identifier allocated to said node at the time of the reallocation, identifying in the node-specific data structure of said node the entries corresponding to said old distribution identifier, and clearing said entries from the node-specific data structure of said node.

3. A method according to claim 1, further comprising:
adding a new entry to said node-specific data structure in a first node,
communicating said new entry at least to a second node of the network element cluster, and
adding an entry corresponding to said new entry to the common data structure of said second node.

4. A method according to claim 3, further comprising:
adding an entry corresponding to said new entry to the common data structure of said first node.

5. A method according to claim 1, further comprising maintaining in said common data structure of said node entries representing state information needed for handling sets of data packets handled in said node.

6. A method according to claim 1, wherein said state information comprises the source address field and/or the destination address field of an Internet Protocol header, and/or port header fields of a Transmission Control Protocol header and/or port header fields of a User Datagram Protocol header, and/or the identifier header field of an Internet Control Message Protocol header, and/or a Message Identifier field of an Internet Security Association and Key Management Protocol header, and/or an Initiator Cookie field of an Internet Security Association and Key Management Protocol header, and/or the Security Parameter Index field of a security header relating to the IPSec protocol suite, and/or a Session ID field relating to the Secure Sockets Layer protocol, and/or an HTTP Cookie field relating to the HyperText Transfer Protocol.

7. A method according to claim 1, wherein said state information comprises information identifying an authenticated entity.

8. A method according to claim 1, wherein said state information comprises information identifying a secured tunnel, within which data packets of the corresponding set are tunneled.

9. A method according to claim 1, wherein said distribution identifier is a hash value and a hash function is used for calculating a hash value using certain field(s) of a data packet.

10. A method according to claim 1, wherein said distribution information is said distribution identifier.

11. A method according to claim 1, wherein said distribution information is information needed for calculating said distribution identifier for the corresponding data packet.

12. A method according to claim 1, wherein said certain field(s) for calculating a distribution identifier comprise the source address field and/or the destination address field of an Internet Protocol header, and/or port header fields of a Transmission Control Protocol header and/or port header fields of a User Datagram Protocol header, and/or the identifier header field of an Internet Control Message Protocol header, and/or a Message Identifier field of an Internet Security Association and Key Management Protocol header, and/or an Initiator Cookie field of an Internet Security Association and Key Management Protocol header, and/or the Security Parameter Index field of a security header relating to the IPSec protocol suite, and/or a Session ID field relating to the Secure Sockets Layer protocol, and/or an HTTP Cookie field relating to the HyperText Transfer Protocol.

13. A network element node of a network element cluster having at least two nodes, said node comprising:

a first data storage, means for maintaining in said first data storage a first, node-specific data structure comprising entries representing state information needed for handling sets of data packets handled in said node, said sets of data packets handled in said first node being different from sets of data packets handled in any other node of said network element cluster, and each set of data packets containing data packets related to each other in one or more of the following ways: data packets of same packet data connection, data packets of same communication session comprising a plurality-of packet data connections, and data packets of a plurality of packet data connections of same secure tunnel, a second data storage, means for maintaining in said second data storage a second, common data structure comprising at least entries representing state information for data packets handled in one other node of said network element cluster, the contents of said common data structure effectively differing from the contents of said node-specific data structure and including copies of all state information entries maintained in a node-specific data structure of said at least one other node and needed for handling sets of data packets in said at least one other node, and said entries being maintained according to information on how different sets of data packets are distributed among the nodes of the network element cluster, means for receiving changed distribution information dynamically changing distribution of at least one set of data packets from said at least one other node to said node in the network element cluster, and means for selecting, based on said changed distribution information the state information entries of at least one re-distributed set of data packets from said second common data structure in said second data storage and transfers them to said first node-specific data structure in said first data storage of said node, means for receiving a distribution identifiers, which are currently allocated to said node, said distribution identifiers being used for handling at least a plurality of data packets so that a data packet is handled in that node of said network element cluster, to which node a distribution identifier calculated using certain field(s) of said data packet is allocated, a third data storage for storing said distribution identifiers, and wherein said means for maintaining the node-specific and common data structures are adapted to maintain in a plurality of entries of said node-specific.

14. A network element node according to claim 13, wherein:

said means for maintaining the node-specific data structure are adapted to add a new entry to said node-specific data structure in said first storage means, and to communicate said new entry to said means for maintaining common data structure, said means for maintaining the common data structure are adapted to communicate said new entry at least to one other node of the network element cluster, and in that said means for maintaining the common data structure are further adapted to receive an entry from at least one other node of the network element cluster and to add an entry corresponding to said received entry to said common data structure in said second storage means.

15. A network element node according to claim 14, wherein:
said means for maintaining the common data structure are further adapted to add a new entry received from said means for maintaining the node-specific data structure to said common data structure in said second storage means.

16. A network element node according to claim 13, wherein:
said means for receiving distribution identifiers are adapted to receive reallocated distribution identifiers,
said means for maintaining the common data structure are adapted to detect a new distribution identifier being allocated to said node due to the reallocation, said new distribution identifier being a distribution identifier not allocated to said node at the time of receiving reallocated distribution identifiers, and to identify in the common data structure the entries corresponding to said new distribution identifier, and to communicate said entries to said means for maintaining the node-specific data structure for said entries to be added to the node-specific data structure, and
said means for maintaining the node-specific data structure are adapted to detect an old distribution identifier not being anymore allocated to said node due to the reallocation, said old distribution identifier being a distribution identifier allocated to said node at the time of the reallocation, and to identify in the node-specific data structure the entries corresponding to said old distribution identifier, and to clear said entries from the node-specific data structure.

17. A network element node according to claim 13, wherein said first data storage is a portion of kernel space memory.

18. A network element node according to claim 13, wherein said second data storage means is a portion of user space memory.

19. A network element node according to claim 13, wherein said first data storage is a portion of content addressable memory.

20. A network element node according to claim 13, wherein said first storage means is a part of a cryptographic card.

21. A network element cluster having at least two network element nodes, at least one of said nodes comprising:
a first data storage means,
means for maintaining in said first storage means a first, node-specific data structure comprising entries representing state information needed for handling sets of data packets handled in said node, said sets of data packets handled in said node being different from sets of data packets handled in any other node of said network element cluster, and each set of data packets containing data packets related to each other,
a second data storage means, and
means for maintaining in said second storage a second, common data structure comprising at least entries representing state information needed for handling sets of data packets handled in one other node of said network element cluster, the contents of said common data structure effectively differing from the contents of said node-specific data structure and including copies of all state information entries maintained in a node-specific data structure of said one other node and needed for handling sets of data packets in said one other node, said entries being maintained according to information on how different sets of data packets are distributed among the nodes of the network element cluster,
means for receiving changed distribution information dynamically changing distribution of at least one set of data packets from said one other node to said at least one node in the network element cluster, and
means for selecting based on said changed distribution information the state information entries of at least one re-distributed set of data packets from said second common data structure in said second data storage and transferring them to said first node-specific data structure in said first data storage means of said at least one node;
means for allocating to each node belonging to said network element cluster certain node-specific distribution identifiers, each node having separate node-specific distribution identifiers allocated to it, said distribution identifiers being used for handling at least a plurality of data packets so that a data packet is handled in that node of said network element cluster, to which node a distribution identifier calculated using certain field(s) of said data packet is allocated, and in that said at least one node further comprises:
means for receiving a distribution identifiers, which are currently allocated to said node, and
a third data storage for storing said distribution identifiers, and
wherein said means for maintaining the node-specific and common data structures are adapted to maintain in a plurality of entries of said node-specific and common data structures in said first and second data storage means distribution information relating to the distribution identifier, which corresponds to the set of data packets related to the respective entry.

22. A network element cluster according to claim 21, wherein:
said means for allocating distribution identifiers are adapted to reallocate distribution identifiers to the nodes of said network element cluster, and wherein in said at least one node
said means for receiving distribution identifiers are adapted to receive reallocated distribution identifiers, and
said means for maintaining the common data structure are adapted to detect a new distribution identifier being allocated to said node due to the reallocation, said new distribution identifier being a distribution identifier not allocated to said node at the time of receiving reallocated distribution identifiers, and to identify in the common data structure the entries corresponding to said new distribution identifier, and to communicate said entries to said means maintaining the node-specific data structure for said entries to be added to the node-specific data structure, and
said means for maintaining the node-specific data structure are adapted to detect an old distribution identifier not being anymore allocated to said node due to the reallocation, said old distribution identifier being a distribution identifier allocated to said node at the time of the reallocation, and to identify in the node-specific data structure the entries corresponding to said old distribution identifier, and to clear said entries from the node-specific data structure.

23. A computer-readable medium comprising computer-executable components which, when run on a computer, configure the computer to operate as a network element node of a network element cluster having at least two nodes and each node handling separate sets of data packets, maintain in said network element node a first, node-specific data structure comprising entries representing state information needed for handling sets of data packets handled in said network element node, said sets of data packets handled in said network element node being different from sets of data packets handled in any other node of said network element cluster, and each set of data packets containing data packets related to each other, maintain in said network element node in addition to said node-specific data structure a second, common data structure comprising at least entries representing state information for data packets handled in at least one other node of said network element cluster, the contents of said common data structure effectively differing from the contents of said node-specific data structure and including copies of all state information entries maintained in a node-specific data structure of said at least one other node and needed for handling sets of data packets in said at least one other node, said entries being maintained according to information on how different sets of data packets are distributed among the nodes of the network element cluster, receive changed distribution information dynamically changing distribution of at least one set of data packets from said at least one other node to said network element node in the network element cluster, select based on said changed distribution information, the state information entries of at least one re-distributed set of data packets from said second common data structure and transfer them to said first node-specific data structure of said network element node, receive distribution identifiers, which are currently allocated to said node, said distribution identifiers being used for handling at least a plurality of data packets so that a data packet is handled in that node of said network element cluster, to which node a distribution identifier calculated using certain field(s) of said data packet is allocated, and maintain in a plurality of entries of said node-specific and common data structures in said first and second data storage distribution information relating to the distribution identifier, which corresponds to the set of data packets related to the respective entry.

* * * * *